Dec. 9, 1952  K. F. GALLIMORE ET AL  2,620,710
MACHINE TOOL
Filed Sept. 4, 1947  3 Sheets-Sheet 2
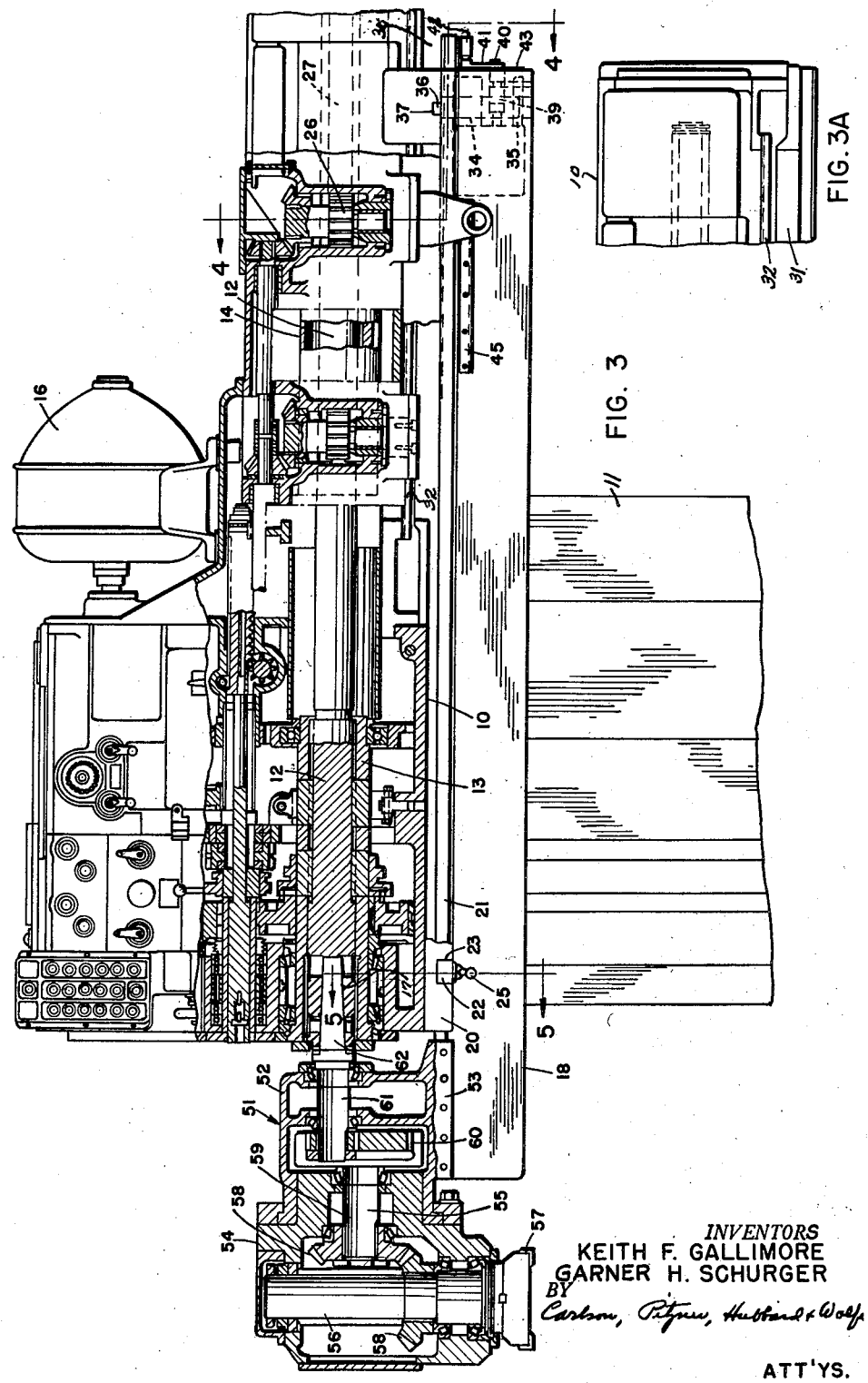
*INVENTORS*
KEITH F. GALLIMORE
GARNER H. SCHURGER
BY
Carlson, Pitzner, Hubbard & Wolf
ATT'YS.

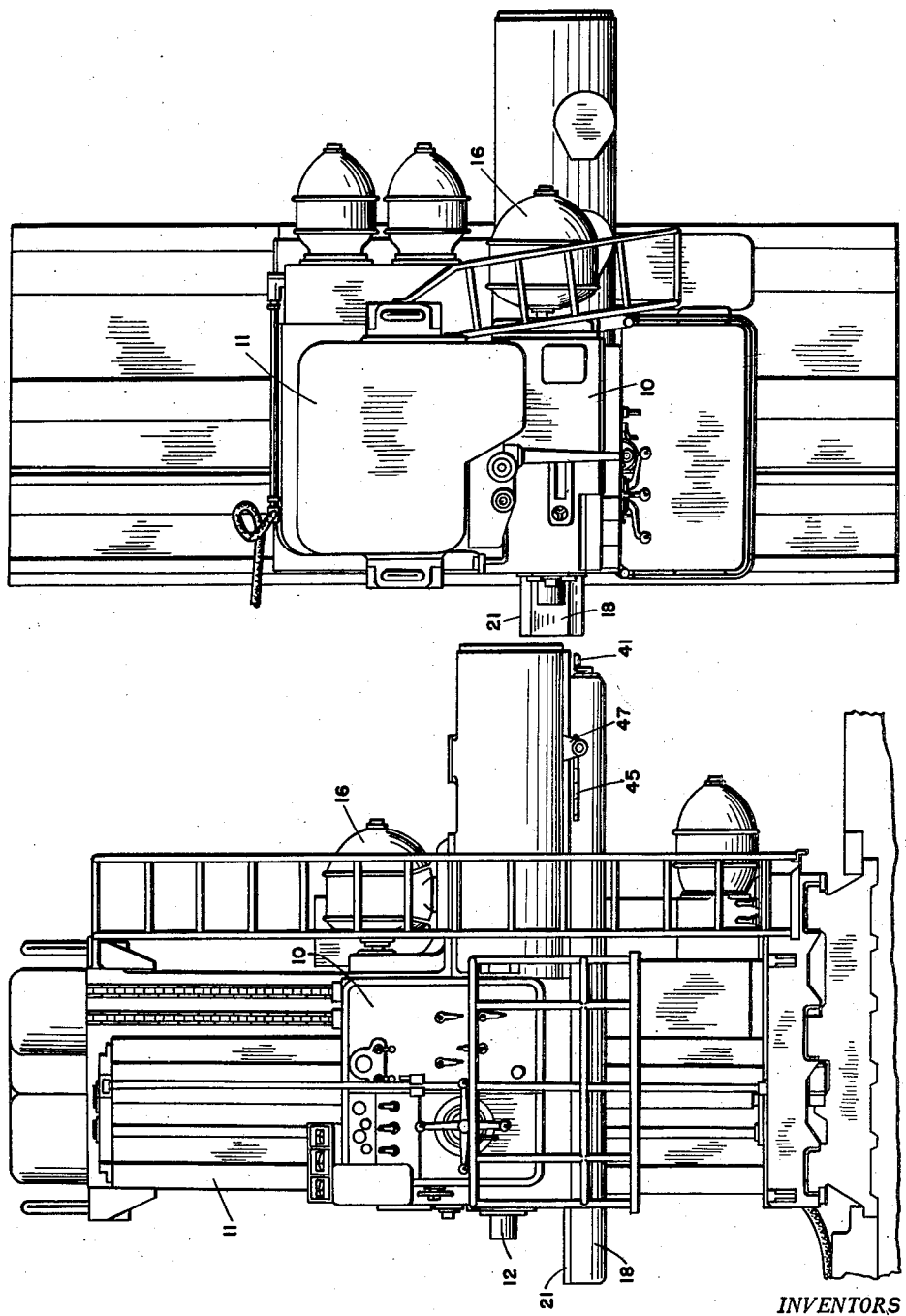

Dec. 9, 1952    K. F. GALLIMORE ET AL    2,620,710
MACHINE TOOL

Filed Sept. 4, 1947    3 Sheets-Sheet 3

*INVENTORS*
KEITH F. GALLIMORE
GARNER H. SCHURGER
BY
Carlson, Pitzner, Hubbard & Wolfe
ATT'YS.

Patented Dec. 9, 1952

2,620,710

UNITED STATES PATENT OFFICE 2,620,710

MACHINE TOOL

Keith F. Gallimore and Garner H. Schurger, Fond du Lac, Wis., assignors to Giddings & Lewis Machine Tool Company, Fond du Lac, Wis., a corporation of Wisconsin Application September 4, 1947, Serial No. 778,680

7 Claims. (Cl. 90—20.5)

The present invention relates generally to improvements in machine tools, and more particularly to a spindle headstock having utility in machines of the type commonly known as horizontal boring, drilling and milling machines.

Headstocks of the foregoing character are commonly provided with a rotary spindle which is adapted to be projected and retracted axially for various metal removing operations, and to the outer end of which various tools, tool fixtures and tool attachments are adapted to be connected for operation. Heretofore, the range of usefulness of such headstocks has been limited because of the lack of suitable means for adequately supporting the outer end of the spindle when extended a substantial distance from the headstock housing, or supporting certain types of fixtures and attachments directly in driving relation with the spindle and for axial movement therewith.

One of the objects of the present invention is to provide a spindle headstock incorporating means for directly supporting various tools, tool fixtures or tool attachments on or in operative association with the outer end of a spindle for operation thereby and for axial translation therewith, thereby providing greater flexibility of operation and increased range of utility.

A further object is to provide a spindle headstock in which the supporting means is movably confined on the headstock for joint translation with the spindle, and may be selectively connected for use or disconnected and retracted out of the way when not in use.

Another and more specific object is to provide the supporting means in the form of an underarm which is slidably guided on the headstock housing in parallel relation to the spindle and arranged to be disengageably connected for joint feed drive with the spindle, and which when disconnected from the feed drive is capable of independent translation.

A further object is to provide a spindle headstock with an underarm slidable thereon in parallel relation to the spindle and for supporting various tool holding fixtures adapted for shaping and planing operations.

Another object is to provide a spindle headstock with a slidable underarm parallel to the spindle, and arranged to support various milling cutters and milling attachments connected for rotary drive and translation to the spindle.

Other objects and advantages will become apparent as the description proceeds.

In the accompanying drawings, Figure 1 is a fragmentary front elevational view of a horizontal boring, drilling and milling machine of the type disclosed in the patent to Keith F. Gallimore No. 2,251,015 issued July 29, 1941, but having a spindle headstock modified to embody the features of the present invention.

Fig. 2 is a fragmentary plan view of the machine.

Fig. 3 is a front elevational view of the improved headstock with a portion of the casing broken away to show the arrangement of the tool spindle and the underarm, the headstock being equipped with a swivel angular milling attachment.

Fig. 3a is a fragmentary view of the spindle and underarm shown in Fig. 3 but enlarged somewhat to better illustrate the slot and guard arrangement.

Figure 7:
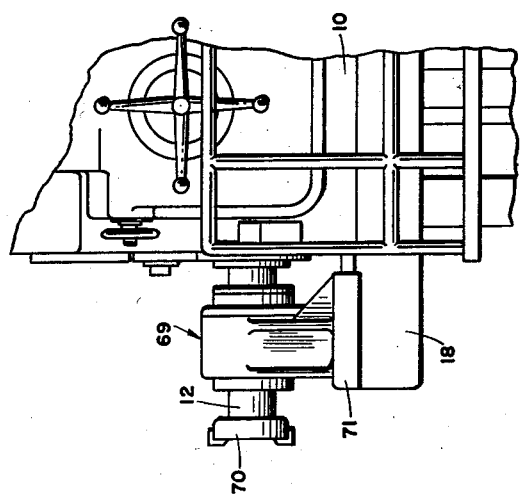
Fig. 7 is a view similar to Fig. 6, but illustrating an attachment adapted to perform face milling operations.

Referring more particularly to the drawings, it will be understood that the auxiliary or outboard supporting means constituting the present invention, may be utilized with a translatable spindle in various forms of spindle headstocks for various types of machine tools. It is, however, especially useful and hence disclosed in connection with a spindle headstock of a type commonly employed in horizontal boring, drilling and milling machines. Thus, the headstock, constituting the exemplary embodiment of the invention, comprises a housing 10 which is mounted for vertical adjustment or translation on a column 11, and which has journaled therein for rotary drive and axial feed translation a main horizontal spindle 12. To support the spindle 12 for both speed and feed drives, the forward end thereof extends through and is slidably splined for axial movement in a drive quill 13 journaled in fixed position within the housing 10, and the rear end thereof extends through and is journaled within a cylindrical feed ram 14 slidable within a ram guide 15 in the housing.

Any suitable means may be provided for driving the quill 13, and hence the spindle 12, selectively at any one of a series of speeds over a selective speed range, and similarly for axially translating the ram 14, and hence the spindle, at any one of a series of feeds over a selective feed range. The specific drive means per se form no part of the present invention, and hence are not disclosed in detail. It is believed sufficient to state that the speed and feed drive mechanisms may be the same as those disclosed in the aforesaid patent to Gallimore No. 2,251,015 in which they are arranged for selective connection and adjustment and to derive power from a common electric drive motor 16 mounted on the exterior of the housing 10.

In the particular headstock herein disclosed, the spindle 12 is disposed substantially in horizontal position, and the front end thereof is adapted for drive connection with a suitable tool, tool holding fixture or tool attachment. The spindle 12 is adapted to be projected axially out of the headstock casing 10 either into a fixed extended position of adjustment, or in a feeding translation, within its range of axial movement. In the present instance, the forward or nose end of the spindle is formed with a Morse taper socket 17 adapted to receive a taper shank for transmitting the rotary drive to the tool. In prior conventional constructions, the shank would normally constitute a support for the drill or other cutting tool. Also, it has been the practice to mount various attachments on the encircling end of the quill 13, and to utilize the spindle 12 as an actuating member for some element of the attachment, but in such arrangement projection of the cutting tool or tools in a cutting translation into extended position axially of the spindle has been precluded because of the fixed support of the attachment on the quill. Consequently, rotary spindle headstocks of the present type have not been adapted for such operations as planing and shaping through axial translation of the spindle, and milling attachments have not been supported in substantially extended position from the headstock.

The primary objective of the present invention is to provide the spindle headstock with an auxiliary or outboard supporting member translatable with the spindle 12, and adapted to afford a rigid support for any tool, fixture or attachment operatively associated with the spindle in any extended position of the latter. In the present instance, the supporting member comprises an elongated arm 18 extending parallel to the spindle 12 and slidably guided for longitudinal adjustment or translation on the housing 10.

The arm 18 may be supported on any suitable portion of the housing 10, but preferably is mounted on the underside thereof, so as to constitute an underarm adapted to be projected with the spindle and to extend in supporting position beneath the latter. Also, the underarm 18 may be provided in any suitable form and construction, and in the present instance is shown as of closed hollow generally rectangular shape.

To afford suitable means for supporting the underarm 18, the housing 10 is closed at the bottom by a guide plate 19 formed with spaced parallel longitudinal dovetailed guideways 20. The underarm 18 has formed along its opposite top edges dovetailed guides 21 complemental to and slidable in the ways 20.

Suitable clamping means is provided for securing the underarm 18 when desired in position of adjustment, and in the present instance comprises a block 22 disposed in a slot 23 interrupting one of the guideways 20 for wedge engagement with the overlying guide 21. A clamp screw 24, provided with a hand lever 25, extends through the block 22 into threaded engagement with the housing 10, and is adapted to be tightened to clamp the underarm 18 in position.

The underarm 18 is arranged for joint or synchronous longitudinal adjustment or feed translation with the spindle 12. The means for effecting operative association between the spindle 12 and the arm 18 may be of any suitable character, and preferably, comprises a disengageable latching mechanism for effecting a direct positive mechanical connection so that when the feed drive for the spindle 12 is actuated it will serve at the same time to impart motion from the spindle to the underarm. More particularly, the conventional feed drive is connected through a pinion 26 meshing with a gear rack 27 cut in one side of the feed ram 14. A block 28 is rigidly secured in a flat notch 29 to the underside of the ram 14. Preferably, the block 28 is of sectional construction, comprising an upper part bolted to the ram 14, and a lower part bolted to the upper part and having a central depending lug 30 extending slidably into a longitudinal slot 31 formed in and opening through the guide plate 19 intermediate the spaced guideway 20.

To prevent the leakage of oil from the interior of the housing 10 through the slot 31, an elongated metal guard 32 with depending side flanges is rigidly secured at opposite ends within the housing and extends longitudinally over and along the slot. To avoid interference with the block 28, the parts thereof define an intermediate opening 33 through which the guard 32 is arranged to extend. Thus, upon translation of the feed ram 14, the block 28 is freely movable along the guard 32, and the latter is disposed at all times completely over the slot 31.

The latching mechanism may be of any suitable character, and in the present instance comprises a vertical plunger 34 slidable in a guide bearing 35 formed in and opening through the rear end portion of the underarm 18. The upper end of the plunger 34 is formed with a large diametrical key 36 extending transversely of the underarm 18 and movable vertically into and out of a complemental keyway 37 in the lower end of the lug 30. Formed in one side of the plunger 34 is a gear rack 38 meshing with a pinion 39 on a rockshaft 40 journaled in and extending to the rear end of the underarm 18. A hand lever 41 is fixed on the outer end of the shaft 40 for adjusting the plunger 34, through the rack and pinion connection, selectively into operative position to connect the ram 14 and arm 18 for joint movement, or into retracted position to disengage the arm from the ram. A spring detent 42 on the free end of the lever 41 is engageable in either of two holes 43 in the end wall of the arm 18 to secure the lever releasably in either selective position of adjustment. Also, spaced stops 44 projecting from the end wall of the underarm 18 serve to limit the movement of the lever 41.

When the latching plunger 34 is disengaged, and assuming that the clamp block 22 is released, the underarm 18 may be slidably adjusted along the guideways 20 independently of the spindle ram 14. As a result, the underarm 18, when its use is not required, may be moved out of the way into fully retracted position in which its forward end is substantially flush with the front face of the housing 10, and the spindle 12 may be utilized in any conventional manner, the same as if the underarm were not present. To provide means for facilitating independent translation, the underarm 18 is provided along one side with a longitudinal gear rack 45 arranged for engagement with a pinion 46 journaled in one side of the housing 10. Preferably, a depending bracket 47 formed with a transverse bearing sleeve 48 is bolted to the housing 10 substantially in the transverse plane of the pinion 26. The pinion 46 is fixed on one end of a rockshaft 49 adapted to be inserted through the bearing sleeve 48 to position the pinion for operative engagement with the rack 45, and provided on the outer end with a hand crank 50. Assuming that the underarm 18 is connected to the feed ram 14 and that it is desired to disengage the underarm and to move it into its idle or retracted position, the spindle 12 if projected will first be retracted into its innermost position. The underarm 18 is retracted with the spindle 12, and at the end of the retract movement of the latter, the gear rack 45 on the side of the arm will be located with the rear end projecting past the bearing sleeve 48. Then the lever 41 is actuated to retract the latching plunger 34, and the shaft 49 is inserted through the sleeve 48 to mesh the pinion 46 with the gear rack 45. Thereupon, the crank 50 may be operated to fully retract the underarm 18.

The forward or outer end of the underarm 18 is constructed for operative disposition in supporting relation to any one of various types of tools, tool fixtures, or cutting attachments associated for rotary driving function with the forward end of the spindle 12. Fig. 3 illustrates one form of milling attachment 51 supported by the underarm 18 for bodily translation with the spindle 12. In the particular form shown, the attachment 51 has a bearing housing 52, which is formed on the underside with guides 53 interfitting with the guides 21 on the forward end of the underarm 18 and adapted to be securely clamped thereto. The attachment 51 is provided with a swivel head 54 mounted on the outer end of the housing 52 for angular adjustment about an axis 55 parallel to the spindle axis. A transverse tool spindle 56 is journaled in the head 54, and has a milling cutter 57 secured to one end. The spindle 56 is connected for rotary drive through bevel gears 58 to a perpendicular shaft 59 which is in turn connected through speed reduction gearing 60 to a shaft 61 having a tapered arbor 62 secured in the spindle socket 17 for rotary drive. It will be evident that the underarm 18 affords a rigid support for the attachment 51 movable with the headstock spindle 12 so that the attachment may be located for operation in any extended position from the headstock housing 10 throughout the range of spindle travel.

Figure 6:
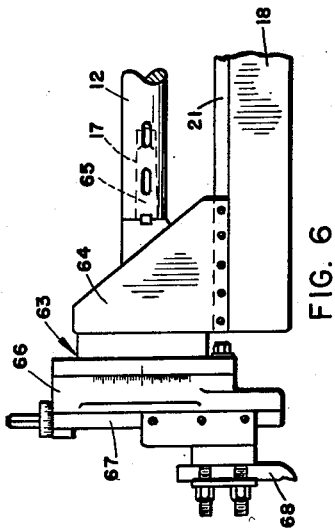
Fig. 6 is a fragmentary side elevational view illustrating a shaping attachment clamped to the underarm and connected to the spindle.
Figure 4:
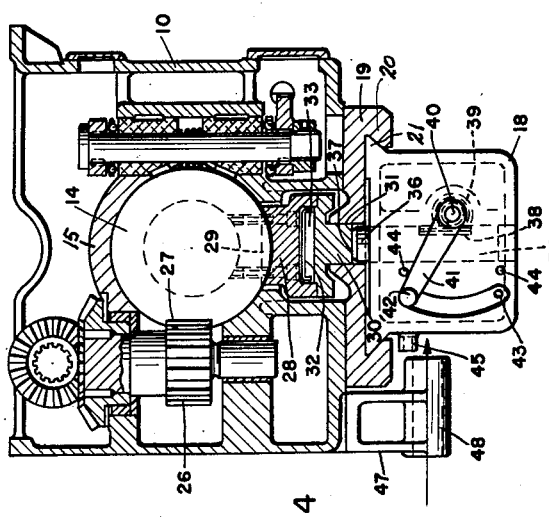
Fig. 4 is a transverse vertical sectional view of the headstock taken substantially along the line 4—4 of Fig. 3.
Figure 5:
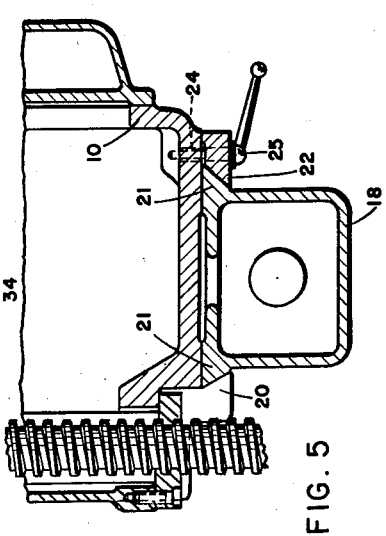
Fig. 5 is a fragmentary transverse vertical sectional view of the headstock taken substantially along line 5—5 of Fig. 3.

Fig. 6 illustrates a shaping attachment 63 which is similarly clamped to the forward end of the underarm 18. In the particular form shown, the attachment 63 has a body 64 with a taper shank 65 secured in the headstock spindle 12. A swivel 66 with a transverse guideway 67 is mounted on the the outer face of the body 65 for angular adjustment about the spindle axis. A shaping tool 68 is mounted for adjustment along the swivel guideway 67. In this form, the speed drive is disconnected so that the spindle does not rotate.

Fig. 7 illustrates use of the underarm 18 for supporting an antifriction spindle support 69. In this instance, a milling cutter 70 is secured to the end of the headstock spindle 12. The spindle support 69 comprises a bearing bracket 71 through which the spindle 12 extends, and which is securely clamped to the forward end of the underarm 18. In this arrangement, the headstock spindle 12 may be projected in a feed motion to extend the milling cutter 70 a considerable distance, and the underarm 18 will afford an adequate outboard support in all positions of adjustment or translation to insure adequate rigidity for the machining operation.

It will be evident from the foregoing that the underarm 18 affords means for supporting the projected end of the spindle or any tool, fixture or attachment associated in driving relation therewith in any position throughout the range of spindle movement. Consequently, great rigidity is obtained so as to insure accurate machining. The traveling support also increases the range of utility of this type of spindle headstock since it permits of bodily translation of special fixtures and attachments with the spindle, and effective utilization of the spindle translation for shaping and planning operations.

We claim as our invention:

1. In a spindle headstock, in combination, a housing, a spindle mounted in said housing for rotary drive and for projected axial translation, a ram for translating said spindle, the outer end of said spindle being constructed for connection with a tool element, an elongated supporting member slidably mounted on said housing in parallel relation to said spindle for longitudinal translation, the outer end of said member being constructed for rigid connection to said tool element to provide a support for the latter, and disengageable means for connecting said member directly to said ram for positive joint translation with said spindle.

2. In a spindle headstock, in combination, a housing, a spindle mounted in said housing for rotary drive and for projected axial translation, the outer end of said spindle being constructed for connection with a tool element, an elongated supporting member slidably mounted on said housing in parallel relation to said spindle for longitudinal translation, the outer end of said member being constructed for rigid connection to said tool element to provide a support for the latter, a ram housing the inner end of said spindle for axial movement therewith, a block secured to said ram and having a transverse notch, a locking plunger carried by said member for adjustment into and out of engagement in said notch, and means for shifting said plunger.

3. In a spindle headstock, in combination, a housing, a spindle mounted in said housing for rotary drive and for projected axial translation, the outer end of said spindle being constructed for connection with a tool element, an elongated supporting member slidably mounted on said housing in parallel relation to said spindle for longitudinal translation, the outer end of said member being constructed for rigid connection to said tool element to provide a support for the latter, a ram housing the inner end of said spindle for axial movement therewith, a block secured to said ram and having a transverse notch, a locking plunger carried by said member for adjustment into and out of engagement in said notch, means for shifting said plunger into and out of said notch, and a rack and pinion mechanism for retracting said member into inoperative position when said plunger is disengaged from said ram.

4. In a spindle headstock, in combination, a housing, a spindle mounted in said housing for rotary drive and for projected axial translation, a member coupled to and translatable with said spindle, the outer end of said spindle being constructed for connection with a tool element, said housing having guideways on the underside extending longitudinally of said spindle, an elongated underarm having ways slidable in said guideways, and means for connecting said underarm to said member to effect unitary translation of the underarm with said spindle, the outer end of said arm being arranged to support said tool element.

5. In a spindle headstock, in combination, a housing, a spindle mounted in said housing for rotary drive and for projected axial translation, the outer end of said spindle being constructed for connection with a tool element, said housing having guideways on the underside extending longitudinally of said spindle, and being formed with an intermediate longitudinal slot, a block connected to said spindle for translation therewith and depending through said slot, an elongated underarm slidably mounted on said housing and extending longitudinally of said housing, and disengageable means for connecting said arm to said block, the outer end of said arm being arranged to support said tool element.

6. In a spindle headstock, in combination, a housing, a spindle mounted in said housing for rotary drive and for projected axial translation, the outer end of said spindle being constructed for connection with a tool element, said housing having guideways on the underside extending longitudinally of said spindle, and being formed with an intermediate longitudinal slot, a block connected to said spindle for translation therewith and depending through said slot, and formed with a transverse slot, a guard strip extending through said transverse slot and along and over said longitudinal slot and anchored at opposite ends in said housing, an elongated underarm slidably mounted on said housing and extending longitudinally of said housing, and disengageable means for connecting said arm to said block, the outer end of said arm being arranged to support said tool element.

7. In a spindle headstock, in combination, a housing, a spindle mounted in said housing for rotary drive and for projected axial translation, the outer end of said spindle being constructed for connection with a tool element, said housing having guideways on the underside extending longitudinally of said spindle, and being formed with an intermediate longitudinal slot, a block connected to said spindle for translation therewith and depending through said slot, and formed with a transverse slot, a guard strip extending through said transverse slot and along and over said longitudinal slot and anchored at opposite ends in said housing, an elongated underarm slidably mounted on said housing and extending longitudinally of said housing, and disengageable means for connecting said arm to said block, the outer end of said arm being arranged to support said tool element, means for translating said underarm independently of said spindle, and means for clamping said arm in selected position of translation.

KEITH F. GALLIMORE.
GARNER H. SCHURGER.

REFERENCES CITED

The following references are of record in the file of this patent:

UNITED STATES PATENTS

| Number | Name | Date |
|---|---|---|
| 815,697 | Hagman | Mar. 20, 1906 |
| 1,188,339 | Sinderson | June 20, 1916 |
| 1,369,749 | Kriesel | Feb. 22, 1921 |
| 1,800,267 | Sundstrand | Apr. 14, 1931 |
| 1,882,158 | Morton | Oct. 11, 1932 |
| 1,932,984 | Nenninger et al. | Oct. 31, 1933 |
| 2,218,469 | Hassman | Oct. 15, 1940 |